United States Patent [19]

Hilterhaus et al.

[11] Patent Number: 4,669,919
[45] Date of Patent: Jun. 2, 1987

[54] PROCESS FOR CONSOLIDATION AND SEALING COAL AND/OR ROCK, SOIL AND BRICK FORMATIONS IN MINING, TUNNELLING AND CONSTRUCTION

[75] Inventors: Karl-Heinz Hilterhaus, Georgsmarienhutte; Hans Norkus, Dortmund, both of Fed. Rep. of Germany

[73] Assignees: KVT Kunststoffverfahrenstechnik GmbH & Co.; Willich GmbH & Co., both of Dortmund, Fed. Rep. of Germany

[21] Appl. No.: 741,561

[22] Filed: Jun. 5, 1985

[30] Foreign Application Priority Data

Jun. 6, 1984 [DE] Fed. Rep. of Germany ....... 3421085

[51] Int. Cl.$^4$ .......................... E02D 3/12; C09K 7/00
[52] U.S. Cl. .................................... 405/264; 523/131; 405/263; 405/258
[58] Field of Search ............... 405/263; 523/130, 131, 523/132

[56] References Cited

U.S. PATENT DOCUMENTS

| | | | |
|---|---|---|---|
| 3,607,794 | 5/1968 | Abbotson et al. | 260/2.5 A |
| 3,841,102 | 10/1974 | Cinner et al. | 405/262 |
| 3,865,600 | 2/1975 | Pearson et al. | 405/263 |
| 3,983,081 | 9/1976 | Dieterich et al. | 521/100 |
| 4,097,422 | 6/1978 | Markusch | 521/100 |
| 4,097,423 | 6/1978 | Dieterich | 521/100 |
| 4,105,594 | 8/1978 | Dieterich et al. | 521/100 |
| 4,129,696 | 12/1978 | Markusch et al. | 521/122 |
| 4,136,238 | 1/1979 | Hilterhaus et al. | 521/107 |
| 4,252,919 | 2/1981 | Wagner et al. | 525/418 |
| 4,307,980 | 12/1981 | Meyer et al. | 405/264 |
| 4,350,775 | 9/1982 | Blount | 521/100 |
| 4,475,847 | 10/1984 | Cornely et al. | 523/131 |
| 4,596,838 | 6/1986 | Andreichuk | 523/131 |

FOREIGN PATENT DOCUMENTS

| | | |
|---|---|---|
| 637889 | 3/1962 | Canada. |
| 0000579 | 10/1980 | European Pat. Off. . |
| 1770384 | 10/1971 | Fed. Rep. of Germany . |
| 1758185 | 11/1972 | Fed. Rep. of Germany . |
| 1784458 | 4/1973 | Fed. Rep. of Germany . |
| 2460834 | 6/1976 | Fed. Rep. of Germany . |
| 2542279 | 4/1977 | Fed. Rep. of Germany . |
| 2908746 | 9/1980 | Fed. Rep. of Germany . |
| 1564384 | 4/1969 | France . |
| 1275941 | 6/1972 | United Kingdom . |

OTHER PUBLICATIONS

Stahl, Gluckauf, 104, pp. 666-670 (1968).
Maurer, Gluckauf, 113, pp. 707-711 (1977).

Primary Examiner—Cornelius J. Husar
Assistant Examiner—Kristina I. Hall
Attorney, Agent, or Firm—James F. Haley, Jr.

[57] ABSTRACT

The invention relates to a process for consolidating and sealing coal and/or rock, soil and brick formations in mining, tunnelling and construction by reacting polyisocyanates and aqueous alkali silicate solutions in the presence of a catalyst prompting the trimerization of the polyisocyanate. The catalyst is used in an amount of 6.0 to 14.5 mmole per mole of NCO groups in the reaction mixture.

When the reaction mixture is introduced into the coal and/or rock, soil and brick formation to be consolidated and is cured, excellent consolidation results are achieved on account of the formation of an "interpermeated network" of inorganic and organic polymer.

14 Claims, 2 Drawing Figures

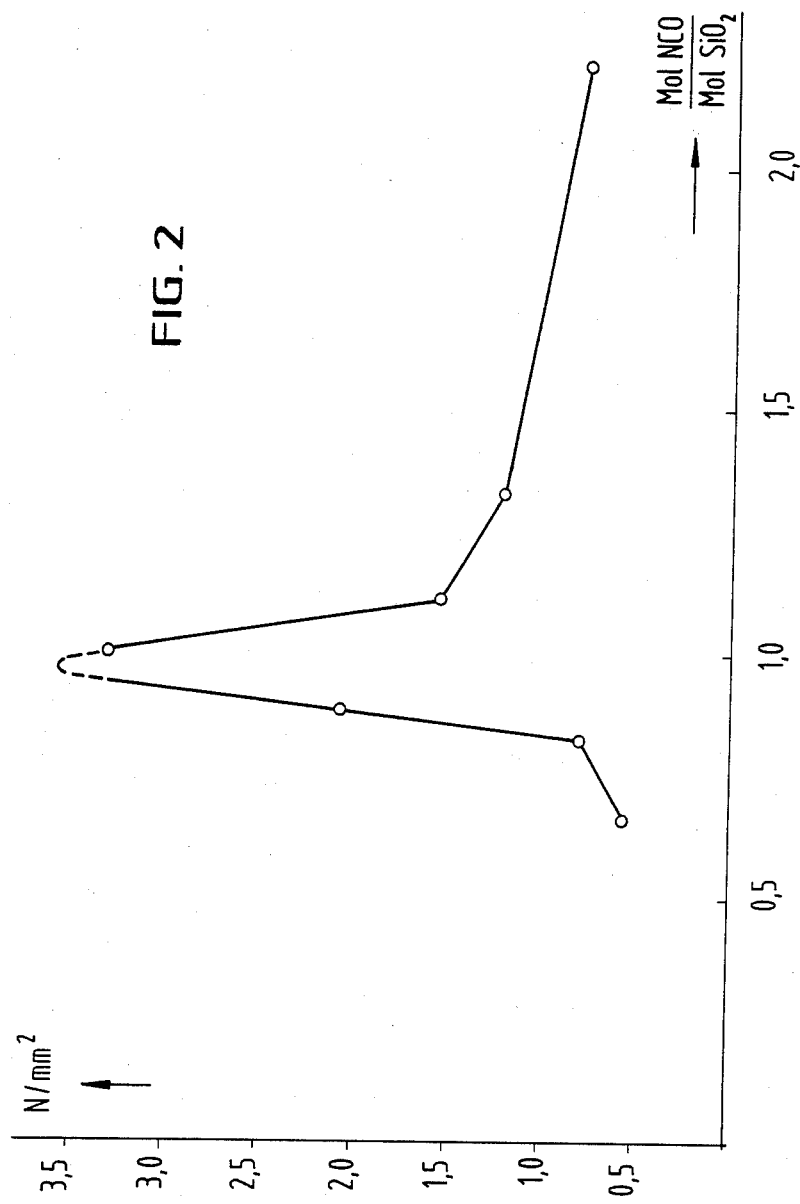

PROCESS FOR CONSOLIDATION AND SEALING COAL AND/OR ROCK, SOIL AND BRICK FORMATIONS IN MINING, TUNNELLING AND CONSTRUCTION

BACKGROUND OF THE INVENTION

Polyurethane systems have been widely used in underground coal mining in order to consolidate and seal geological and loosened rock and soil formations; see "Glückauf" (1968), pages 666–670; "Glückauf" (1977), pages 707 to 711; "Bergbau" (1977), pages 124–129; DE-A-17 58 185 and DE-A-17 84 458.

Polyurethane systems are not, however, suitable for rock formations carrying water, since water reacts with polyisocyanate with the result that the stoichiometric ratio of the reactants is crucially unbalanced. Moreover, the product mostly formed from water and polyisocyanate is polyurea which does not bind cracks and fissures.

Another disadvantage of using polyurethane in coal mining is the fact that the cured product is highly inflammable.

A process for consolidating and sealing geological and loosened rock, soil and brick formations and coal, which makes use of the reaction of polyisocyanates with water glass is known from DE-A-29 08 746. In this known process, water glass solutions and polyisocyanates are intimately mixed and this emulsion is allowed to cure in the formation to be consolidated.

In the known process, up to 2 weight percent of accelerators known in polyurethane chemistry, are added to the mixture. Preferred accelerators are organometallic compounds such as dibutyl tin dilaurate or tert. amines, such as triethylamine. Moreover, known blowing agents, such as acetone, methylene chloride, monofluorotrichloromethane, dichlorodifluoromethane and butane are used in amounts of up to 30 weight percent, based on the polyisocyanate/water glass solution mixture. Finally compounds having at least one reactive group with respect to the polyisocyanate, preferably polyols, are added to the mixture in an amount of up to 30 weight percent, based on the water glass solution.

However, because of the insufficient physical properties and mechanical strength of the resulting organomineral products, the process known from DE-A-29 08 746 does not render the coal or rock and brick formation satisfactorily consolidated. For instance, known non-expanded reaction products of polyisocyanate and water glass show insufficient tensile bending strength after 2 hours at 50° C. After 8 days they still show tensile strength bending values which are lower than the corresponding values of purely organic products (polyurethane). The latter reach their curing maximum after about 4 hours and do not get any harder after this time. While in polyurethane systems shorter curing times are possible, they are critical in view of the exothermic reaction, as they can lead to the self-ignition of the coal bed.

When taking a closer look at reaction systems consisting of water glass solutions and NCO-group bearing preparations, the difficulties in the formulation will become apparent. On the one hand, the complicated chemical reaction scheme has to be made controllable operation-wise. On the other hand, the end product must meet very specific requirements. Since the requirements are frequently diametrically opposed, the common denominator found is insufficient. So far, these facts have considerably restricted the use of reasonably priced water glass solutions as organic/inorganic systems.

In reaction systems containing a polyisocyanate and an aqueous water glass solution a stoichiometric NCO-/OH ratio cannot be achieved so that the reaction proceeds in an uncontrollable manner. Therefore, the polyisocyanate cannot be expected to form in any way an organic polymer structure of any practical use. For this reason, the reaction of polyisocyanate in water glass solutions is of technical interest only in as far as gaseous $CO_2$ which can be considered as hardener and coagulant for the water glass is released when R-NCO and water react with each other. The low molecular urea product resulting from the polyisocyanate remains distributed in the mineral structure of the water glass as hard filler in the form of very fine particles.

In practical formulation, another problem arises from the excess amount of gaseous $CO_2$. DE-A-17 70 384, for instance, see page 6, lines 9 to 14, already points out the necessity to observe the stoichiometric ratio of the reactants as much as possible. However, it does not indicate how this is to be achieved.

Moreover, in connection with the stoichiometric ratio, only the R—NCO/OH ratio is considered. No thought is given to the importance of a reaction ratio of $Me_2/SiO_2/CO_2$ —defined in whatever way. The next aspect pointed out is that with a higher polyisocyanate portion, the reaction proceeds rapidly and also tends to froth up. In view of these facts, the utility of the products obtainable according to said publication is considerably restricted.

From the mold manufacture where molds from sand and sodium water glass are prepared, it is known that an excess amount of gaseous $CO_2$ used to harden water glass will adversely influence the stability of the molding composition. This is an effect which occurs in a reaction mixture with water glass on account of a high excess amount of polyisocyanate.

In DE-A-24 60 834, a catalyst which is capable of trimerizing polyisocyanate in a manner known per se is added to the reaction mixture water glass/polyisocyanate. However, the process described in said application merely serves to prepare organomineral foams. DE-A-24 60 834 does not give clear teaching as to the amount of catalyst to be used; in the examples using 2,4,6-tris-(dimethylaminomethyl)-phenol as catalyst and polyphenolpolymethylenepolyisocyanate with an NCO-group content of about 28%, said catalyst is used in an amount of about 18 to 36 mmole per mole of NCO groups. In the case of other catalysts or polyisocyanates the ratio is even substantially higher.

It is the primary object of the invention to provide a process for consolidating and sealing coal and/or natural or synthetic rock, soil and brick formations, for instance in mining or tunnelling, by reacting polyisocyanates and aqueous alkali silicate solutions in the coal or rock and soil formation to be consolidated, which process leads under the existing conditions to a satisfactory consolidation of the corresponding formation.

It is a further object of the invention to provide a process of the above-mentioned type by which the consolidated formation is imparted excellent strength, especially tensile bending strength.

It is a further object of the invention to provide a process of the above-mentioned type which leads to a satisfactory consolidation of the formation showing excellent strength within very short time.

It is still another object of the invention to provide a consolidation and sealing process by which mining and tunnelling work can be continued within short time without danger for the workers.

These and other objects and advantages of the invention will become apparent to those skilled in the art from the following description of the invention.

SUMMARY OF THE INVENTION

The problem underlying the invention is solved by the surprising finding that when using a defined amount of specific catalysts, based on the amount of NCO groups present, it is possible to obtain an organomineral product wherein an organic structure and an inorganic structure are three-dimensionally interwoven in such a manner that no volume expansion takes place during the reaction and the final product therefore is a dense, high-strength interpermeated or interpenetrated network which excellently consolidates coal, rock and soil formations.

If a defined amount of a polyisocyanate-trimerization catalyst is added to the reaction mixture of polyisocyanate and water glass solution, on the one hand, the amount of gaseous $CO_2$ necessary for optimally curing the inorganic portion of the mixture is formed, while on the other hand, the polyisocyanate is trimerized sufficiently to build up an organic structure. Thus, an interwoven inorganic and organic three-dimensional structure possessing exellent mechanical strength is formed.

Consequently, the invention relates to a process for consolidating and sealing coal and/or rock, soil and brick formations, for instance in mining, tunnelling and construction by reacting polyisocyanates and aqueous alkali silicate solutions in the coal and/or rock and soil formation to be consolidated, the process being characterized in that the reaction is performed in the presence of a catalyst prompting the trimerization of the polyisocyanate and in that, considering the composition and amount of the aqueous alkali silicate solution, in relation to the polyisocyanate amount, the catalyst is used in such an amount per mole of NCO-groups in the reaction mixture that interwoven networks of inorganic and organic polymer are formed during the reaction.

It has been found that surprisingly, polyisocyanates can be induced to substantially trimerize in aqueous, alkaline $SiO_2$-bearing solutions. In this process, the NCO/water reaction is largely suppressed with the result that gaseous $CO_2$ is formed in an amount that can be controlled by the formulation and optimally used for the reaction with the water glass. During the reaction, two interwoven polymer structures are simultaneously formed.

In the first reaction step, part of the polyisocyanate reacts with the water to give polyurea, while releasing gaseous $CO_2$. The $CO_2$ formed in situ reacts instantaneously with the $Me_2O$ portion of the water glass solution to give $Me_2CO_3 \cdot xH_2O$ (Me is an alkali metal, in particular sodium or potassium). By binding $Me_2O$ from the water glass solution, the $SiO_2$ portion is induced to form polysilicic acid. In the reaction, substantial amounts of heat are released with the result that in the subsequent step a specific further portion of the polyisocyanate can undergo the trimerization reaction. Products trimerized for the first time undergo at least in part a further trimerization and thus, a branched high molecular polymer structure can form.

BRIEF DESCRIPTION OF THE DRAWING

In the attached drawing,

FIG. 1 shows the relationship between the molar ratio of catalyst/NCO groups in the reaction mixture and the tensile bending strength of the products, while FIG. 2 illustrates the relationship between the $NCO/SiO_2$ molar ratio in the reaction mixture and the tensile bending strength of the products.

DETAILED DESCRIPTION OF THE INVENTION

Figure 1:
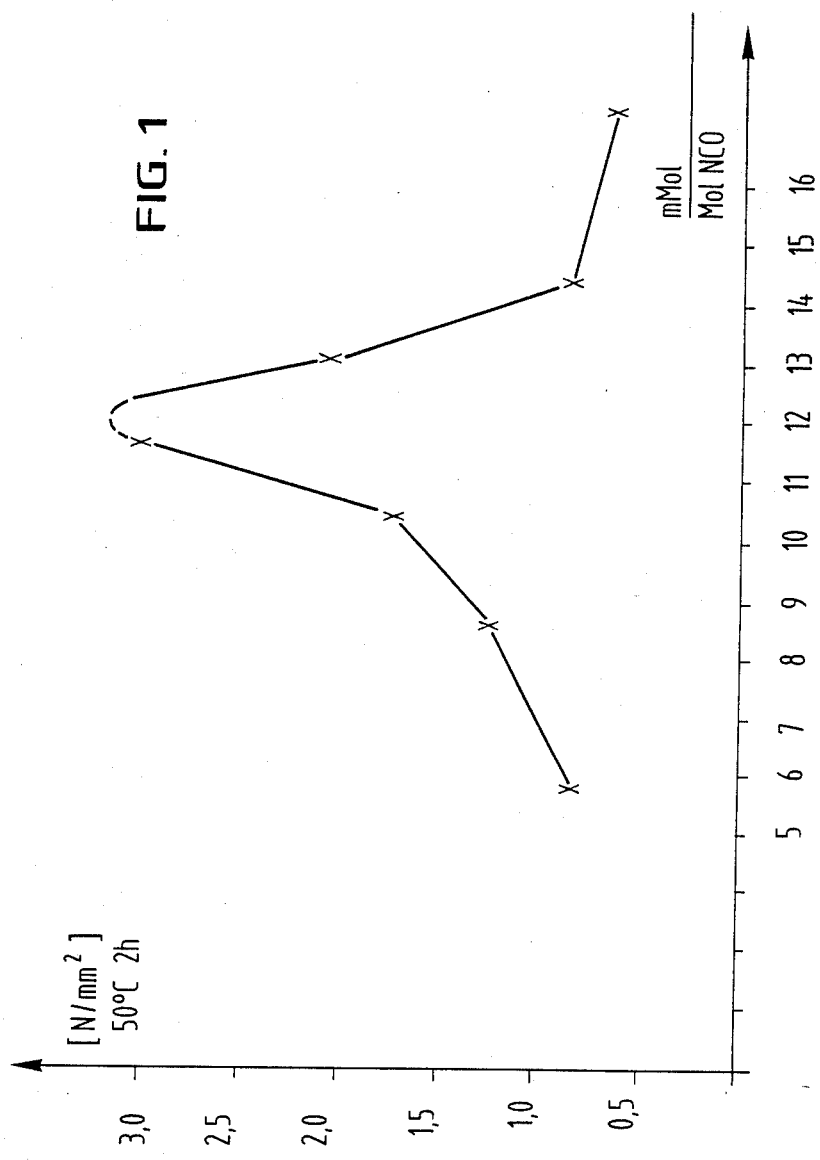

In the process of the invention, excellent adhesion between the reaction product of polyisocyanate and water glass on the one hand and the coal, rock or soil formation on the other hand is already achieved after a short time. After about 2 hours, the consolidated formation already shows tensile bending strength values as are achieved in usual polyurethane processes only after about 4 hours. In addition, the system used according to the invention has the special advantage that the hardness of the consolidated formation constantly increases with time. For instance, the tensile bending strength value measured after 90 hours was about 10 $N/mm^2$.

Surprisingly, the process of the invention can also be performed in moist or water-bearing formations, without the curing being adversely influenced by the environmental water. A hard product in the formation to be consolidated which does not show any tendency to separate can be obtained according to the process of the invention even in water or for instance in alluvial sand. Therefore, the process of the invention can advantageously be used for consolidating coal and rocks in mining as well as for consolidating rocks, stones and/or soil in different types of constructions, for instance in tunnelling.

Because of its high content of inorganic substances, the reaction product obtained by the process of the invention is less inflammable than organic consolidating agents. In the low temperature carbonization test in the quartz tube, it produces less toxic vapors. Moreover, the electric resistance of the material is sufficient so that no electrostatic charging occurs. The self-ignition temperature is not lowered when the powdery reaction product is mixed with coal dust.

Besides, the system employed in the process of the invention also offers the advantage of convenience in use: the substances used as catalyst remain in suspension and compared to the to date frequently used amines, such as triethylene diamine and organometallic compounds, such as dibutyl tin dilaurate, they produce practically no unpleasant odors and do not involve any health hazards.

The necessary components of the reaction mixture used in the process of the invention are a water glass solution, a polyisocyanate and a catalyst suitable for trimerizing polyisocyanates. To achieve satisfactory consolidations, the molar ratio of catalyst/NCO groups must be fixed within precisely defined limits.

The process of the invention can be performed with the aqueous alkali silicate solutions commonly used in this technical field, for instance the water glass solutions described in EP-B-0 000579 and in DE-A-24 60 834. Because of their easy availability and low viscosity, sodium water glasses are preferred. Sodium water glasses with a relatively high solids content advantageously ranging from about 40 to 60, and in particular from about 46 to 52 weight percent of inorganic solids are used preferably. In theory, higher concentrated water glass solutions are also suitable and can be used for the purposes of the invention. However, since they have too high a viscosity entailing processing problems, such water glass solutions are of no practical importance.

Preferably, the molar ratio of $SiO_2$ to $Me_2O$ in the water glass solution used is relatively high and advantageously lies in the range of from about 2.09 to 3.44. The range of from about 2.48 to 3.17, and in particular of from 2.70 to 2.95 is especially preferred.

An $Me_2O$ content within the limits indicated above, promotes the formation of the three-dimensional inorganic silicic acid structure.

In a range where the $Me_2O$ portion is smaller than indicated above, the water glass is highly viscous and therefore presents difficulties in processing. Even very small amounts of reaction $CO_2$ are sufficient to cause the water glass to precipitate and inhomogeneities in mixing result in products with unsatisfactory properties.

If the $Me_2O$ ratio substantially exceeds the indicated range, a high portion of reaction $CO_2$ is required in the formulation for the water glass portion to cure completely. However, this high portion is only obtainable by reducing the amount of the trimerization product. As a consequence, the ratio of urea product/trimerization product is shifted towards the urea whereby the amount of trimerization product contained in and reinforcing the end product is reduced. This also leads to unsatisfactory results.

To obtain a product with optimal strength it is necessary to consider the composition and amount of the water glass in determining the amount of catalyst. Excellent consolidation results are in particular obtained with the process of the invention if the polyisocyanate and the water glass solution are used in an $NCO/SiO_2$ molar ratio of 0.8 to 1.4, preferably 0.85 to 1.15. An $NCO/SiO_2$ molar ratio of about 1.0 is especially preferred.

As already mentioned, it is preferred to use concentrated water glass solutions so as to prevent the products from having too high a water content which would adversely affect their strength characteristics. Moreover, if the reaction mixture is too much diluted, the released heat amount may not be sufficient to initiate the trimerization reaction. The lower limit of the water glass portion is predetermined by the fact that its amount must be sufficient to allow the formation of the inorganic structure. For this purpose, at least about 0.2, preferably at least about 0.5 parts by weight of water glass per part by weight of polyisocyanate are necessary. The upper limit of the permissible water glass portion in a given water glass composition is being arrived at if the amount of $CO_2$ released is no longer sufficient to bind the $Me_2$ portion of the water glass. Then, in the same way as in the case of too high a water content, complete curing is no longer possible. In the case of sodium water glass 48/50 having a molar ratio of $SiO_2/Me_2O$ of about 2.85, the upper limit of the water glass content is for instance about 1.6 to 1.7 parts by weight of water glass per part by weight of polyisocyanate. When water glasses having a different composition are used, the limit values may differ from the indicated ones.

The inventive process can be carried out with the polyisocyanates commonly used in this technical field, for instance those mentioned in EP-B-0000579 and in DE-A-24 60 834. Moreover, NCO preadducts, as are known in the preparation of polyurethanes and described in DE-A-24 60 834 are also suitable.

Polyisocyanates which easily undergo a trimerization reaction to form a three-dimensional organic structure are preferred in the process of the invention. Said polyisocyanates are compounds in which, if possible, the NCO groups participating in the reaction are not at all sterically hindered. A specific example of such a sterically not hindered polyisocyanate is 4,4'-diphenylmethane diisocyanate (also in the form of the phosgenation product of aniline formaldehyde condensates (crude MDI)).

The polyisocyanates used according to the invention preferably contain about 10 to 55% of NCO groups, based on the mass of the polyisocyanate. Polyisocyanates containing 24 to 36, and in particular 28 to 32 weight percent are especially preferred. A smaller content of NCO groups in the polyisocyanate will render the formation of a three-dimensional organic structure more difficult. On the other hand, with a higher NCO content, it can easily happen that too much gaseous $CO_2$ is released, which may result in an overcuring of the inorganic portion of the product.

The third component required in the process of the invention is a catalyst capable of catalyzing the trimerization of the 5 polyisocyanate component. Suitable catalysts are the trimerization catalysts known in polyurethane chemistry which are preferably tertiary amines and amino alcohols. Specific examples of suitable trimerization catalysts are 2,4,6-tris-(dimethylaminomethyl)-phenol, and other Mannich base products exhibiting the structural element

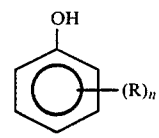

wherein R is a residue of the formula

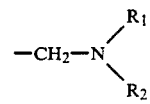

n is 1 to 3 and the residues R are in the ortho or para position $R_1$ and $R_2$ may be the same or different and represent $C_{1-4}$-alkyl, preferably methyl, or $C_{1-4}$-hydroxyalkyl, preferably hydroxymethyl groups. Mixtures of the above-mentioned catalysts may, of course, also be used.

In the process of the invention, the molar ratio of the catalyst to the NCO groups in the reaction mixture is critical, since excellent consolidation results can only be obtained in a relatively narrow range. This ratio is determined by the following criteria, considering the composition and amount of the water glass used:

(a) The amount of catalyst must be sufficient to catalyze the trimerization reaction necessary for the formation of the organic structure.

(b) The amount of catalyst must not be so high as to prompt an uncontrolled, strong exothermic reaction, as too much $CO_2$ would thus be formed and the water would evaporate causing the reaction mixture to froth up and resulting in products of insufficient strength.

If the composition and the amount of waterglass solution are specified according to the invention, the ratio usually is 6.0 to 14.5, preferably 8.5 to 13.8, and in particular 10.2 to 13.3 mmole of catalyst per mole of NCO groups in the reaction mixture.

If the amount of catalyst is lower than the range indicated, a three-dimensional polymeric structure will no longer sufficiently form. On the other hand, too high a catalyst amount will result in insufficient curing of the inorganic portion and as a consequence of the strong exothermic reaction, some expansion of the product will occur.

A cocatalyst may be used to further control the trimerization reaction. Said cocatalyst may for instance consist of a trivalent iron compound, such as $FeCl_3$, as is frequently contained in the various technical polyisocyanates due to the manufacturing process. The other cocatalysts which are known per se are also suitable, i.e. trialkylphosphanes, such as trimethylphospholine, alkali metal salts of carboxylic acids, such as sodium acetate or sodium maleate or transition metal compounds, such as $Sb_2O_3$, $ZrOCl_2$, $SbCl_5$ or $CuCl$.

Consolidations with especially favourable physical properties are obtained by the inventive process if polyisocyanate and water glass are used in such an amount and composition that the mentioned preferred ratio of catalyst amount to NCO groups occurs together with the preferred $NCO/SiO_2$ ratio also mentioned and moreover, the catalyst is present in such an amount that the $CO_2$ amount formed is just sufficient for the $Me_2O$ portion of the water glass to precipitate completely. These conditions are satisfied when using mixtures in which the catalyst is present in an amount of 6.0 to 14.5, preferably 8.5 to 13.8, and in particular 10.2 to 13.3 mmole per mole of NCO groups and when using the polyisocyanate and the alkali silicate solution in an $NCO/SiO_2$ molar ratio of 0.8 to 1.4, preferably 0.85 to 1.15. The water glass should have the usual, preferred composition, that is an $SiO_2/Me_2O$ molar ratio of 2.09 to 3.44; preferably 2.48 to 3.17.

To achieve a satisfactory consolidation of the coal or rock soil and brick formation it is desirable for the catalyst to be evenly distributed in the reaction mixture while the polyisocyanate and water glass solution react with each other. The catalyst is usually added to the water glass solution. However, so far it has not been possible to obtain a stable dispersion, as the mixture dehomogenizes when it is allowed to stand.

It has now been found that the tendency to dehomogenize can be reduced or prevented by adding antimony trioxide to the catalyst-containing mixture. This way, the catalyst can be maintained in dispersion. This finding is independent of the amount of catalyst added, that is the advantageous effect of the addition of antimony trioxide presents itself not only in the teaching of the present invention, but in general in processes for producing organomineral products from polyisocyanates and water glass solutions using trimerization catalysts. The antimony trioxide is used in an amount of about 5 to 100, preferably 20 to 50, and in particular 30 to 40 weight percent, based on the amount of the catalyst.

In principle, the process of the invention does not require the addition of a blowing agent to the reaction mixture. However, depending on the particular formulation and the other reaction conditions, a precisely dosed amount of blowing agent may be added. This amount is small enough not to bring about an expansion of the product during polymerization.

Substances suitable for this purpose are volatile substances which are present in liquid state at room temperature and which, when the water glass reacts with the polyisocyanate, evaporate because of the heat released. Examples of suitable volatile substances are monofluorotrichloromethane, dichlorodifluoromethane and trichlorotrifluoroethane.

Preferably, the amount of volatile substance added is at most 3.5 weight percent, based on the total mass of the reaction mixture. Most preferably, the volatile substance content of the reaction mixture is 1 to 2.8 weight percent. Such a small amount does not cause the product to expand (froth up) during the reaction. Rather, the volatile substance escapes practically completely from the reaction mixture at the beginning of the reaction, leaving various voids and channels which can take up the alkali carbonate solution that is produced by the reaction and remains in the reaction mixture. Moreover, this mechanism contributes to the extraordinary consolidation results of the invention. In the process of the invention, any substantial expansion of the reaction products is deliberately avoided, as only compact consolidation products are capable of sustaining the pressure of the rocks or bricks. On the other hand, the products remain so elastic as to be able to follow the usual movements of rocks in the mm range.

Moreover, nucleating and stabilizing substances may be added to the reaction mixture. Suitable nucleating substances are for instance finely divided solids, such as silicon dioxide or aluminum oxide, optionally used together with zinc stearate, amorphous silicic acids or metal silicates. Of these, the preferred nucleating agent is silicon dioxide precipitated from the colloidal water glass solution.

Suitable stabilizers are silicon oils on the basis of polysiloxanes. They may be added in an amount of about 0.5 to 2, and in particular 0.8 to 1.4 weight percent, based on the total amount of the reaction mixture.

Depending on the desired consolidation properties and the prevailing circumstances, further additives may be incorporated into the reaction mixture. Such additives for instance include organic compounds having groups which are reactive to isocyanate groups. Examples of these compounds are polyols, such as polyester and polyether polyols as well as phosphonate esters, such as tri-$\beta$-chloroethyl-phosphonate or tri-$\beta$-isoesters, propyl-phosphonate which are known in polyurethane chemistry. The amount of the polyols added is to be so small that it does not adversely affect the formation of a three-dimensional organic structure and an inorganic structure interwoven therewith. Expediently, polyol or phosphonate ester are therefore added in amounts of at most 2 to 45, preferably 10 to 20 weight percent, based on the isocyanate component.

Flame-inhibiting or flame-retarding substances may be added to the reaction mixture to reduce the inflammability. Suitable substances are the flame-inhibiting or flame-retarding substances known in the plastics chemistry, such as phosphates and borates. The flame-inhibiting substances may be added in amounts ranging from 2 to 30 weight percent, based on the isocyanate component.

Furthermore, fillers may be added to the reaction mixture in order to achieve a further reinforcement of the products. Examples of suitable fillers are diatomaceous earth, aluminum oxide hydrate, magnesium silicate, asbestos powder, chalk, asbestos fibers and glass fibers. The amount of fillers added mainly depends on the viscosity of the mixture. Preferably, it lies within the range of 0.1 to 30 weight percent, based on the weight of the water glass solution used.

If desired, pigments or dyestuffs may also be added to the reaction mixture.

In the process of the invention it is preferred to first prepare two components (A) and (B). The component (A) consists of the water glass solution and contains both the catalyst and the compound wherein the catalyst is being maintained in dispersion, as well as the polyol, the flame-inhibiting additives, the fillers and the dyestuffs. The component (B) consists of the polyisocyanate and optionally contains the cocatalyst and optionally the volatile substance and the stabilizer. This component may also contain fillers which are compatible with the mentioned components and others of the additives mentioned. Since the antimony trioxide being a suitable dispersant of the catalyst is likewise a useful cocatalyst, it can also be contained in component (A).

The components (A) and (B) are then carefully mixed. The starting time of the resulting mixtures in general is between 5 and about 100 seconds. However, the starting time is not critical and can be controlled as desired. Optionally, the components or the mixture may be heated or cooled in order to adjust the starting time to the requirements. The mixture is incorporated in the usual manner, for instance through boreholes or injection lances, into the coal or rock and soil or brick formation to be consolidated. This can be done applying pressure. The components of the mixture may also be placed into separate parts of a multi compartment cartridge and be mixed together by the destruction of the cartridge after it has been placed into the formation.

The reaction of the mixture starts with the reaction of the NCO groups with the water of the water glass solution, whereby polyurea and gaseous $CO_2$ are formed. This reaction is exothermic and, on the one hand, prompts the evaporation of the volatile substances and on the other hand, under the influence of the catalyst, starts the trimerization of the NCO groups that have remained. The released $CO_2$, in turn, reacts with the $Me_2O$ of the water glass to give alkali metal carbonate, whereby the $Me_2O$ component is eliminated from the water glass. In the course of the reaction, the remaining silicic acid forms a three-dimensional inorganic structure which binds to the simultaneously evolving organic polymer to form an "interpermeated network" of high strength, resulting in excellent consolidation of the coal, rock or soil and brick formations treated. The alkali carbonate solution remaining in the "channels" produced by the escaping volatile substance contributes to increase the strength.

In the process of the invention the two component system consisting of the components A and B can be so adjusted that it can be used with the existing injection equipment without altering the installations. After mixing, the components first pass from a liquid to a plastic state. Depending on the conditions of the rock and the prevailing temperature, the plastic state will remain for a shorter or longer period of time until the mixture finally solidifies to a hard material. Even under unfavourable conditions as for instance in dusty, moist, or even wet rocks, the mixture develops maximum adhesion to coal, rock and brick. Because of the special catalysis, the mixture undergoes a number of harmonized reactions which cause the liquid components to react in such a way as to always give a hard, adhesive end product.

The invention is illustrated by the examples.

The following examples serve to examine the influence which the ratio of mmole catalyst/mole NCO and mole $NCO$/mole $SiO_2$ has on the flexural tensile strength of the reaction products.

EXAMPLE 1

A reaction component A containing the following substances in the indicated amounts is prepared:

| Component | weight % |
| --- | --- |
| Sodium water glass 48/50 | 94.48 |
| $Sb_2O_3$ | 0.58 |
| 2,4,6-tris-(dimethylamino-methyl)-phenol | 1.50 |
| Water | 3.44 |

Separately, a reaction component B is prepared from the following components

| Component: | weight % |
| --- | --- |
| Polyphenylpolymethylene-polyisocyanate with an NCO portion of about 31 weight % | 93.00 |
| Trichlorofluoromethane | 5.00 |
| Stabilizer | 2.00 |

When mixing the two reaction components in a weight ratio of A:B =4:3 (11.36 mmole of catalyst per mole of NCO groups) gelling starts after about 1 minute. A temperature rise is observed after 2 minutes and the mixture cures into an organomineral product.

To test the tensile bending strength of the product, two stones spaced 5 mm apart are held in a fixed position by a scotch linen tape fastenend to the front sides. After having been intensely stirred with a wooden rod, the mixture of the reaction components is cast bubble-free into the gap between the stones shortly before gelling starts.

The tensile bending strength of the structure fastened in this way is measured
 (a) after 2 hours at 20° C.
 (b) after 2 hours at 50° C. (structure in the drying cabinet)
 (c) after 8 days at 20° C.
(Device for measuring the tensile bending strength: Chemische Laboratorien for Tonindustry (chemical laboratories for the clay industry), Prof. Dr. H. Seger and E. Cramer, Berlin). The values obtained are given in Table I.

EXAMPLES 2 to 5 and Comparative Examples 1 and 2

The reaction components A and B are mixed in the ratios indicated in Table I. Moreover the Table also shows the mmole catalyst/mole NCO ratio and the $NCO/SiO_2$ molar ratio that present themselves in the respective mixing ratios. In each case the tensile bending strength is tested in the manner indicated in example 1. The results are compiled in Table I. In FIG. 1 the ratio of mmole catalyst/mole NCO is graphically shown, while FIG. 2 is a graph of the mole NCO/mole $SiO_2$ ratio.

TABLE I

| Example No. | Ratio A:B | mmole catalyst per mole NCO | mole NCO / mole SiO$_2$ | Tensile 2 h 50° C. | bending 2 h 20° C. | strength/N/mm$^2$/ 8 d 20° C. |
| --- | --- | --- | --- | --- | --- | --- |
| 1 | 1.3 | 11.36 | 1.00 | 3.3 | 0.89 | 8.10 |
| 2 | 1.2 | 10.38 | 1.10 | 1.59 | 0.83 | 7.05 |
| 3 | 1.0 | 8.65 | 1.32 | 1.23 | 0.78 | — |
| 4 | 1.5 | 12.97 | 0.88 | 2.07 | 0.82 | — |
| 5 | 1.6 | 14.4 | 0.82 | 0.81 | 0.80 | — |
| Comp. Ex. 1 | 0.6 | 5.77 | 2.20 | 0.76 | 0.88 | 3.8 |
| Comp. Ex. 2 | 2.0 | 17.3 | 0.66 | 0.56 | 0.76 | |

Test Report 1

Consolidation of longwall faces in a coal mine

The following test report illustrates the application of the inventive process in coal mining.

1. Description of the test
1.1 Place
  Seam thickness: 5.2 m max.
  Face advance: ≦3 m/d
  Disturbance: Shale diminishing towards top road
1.1.1 Longwall face
  In the test area there was coal tending to backbreaks because of tectonical fissures, with subsequent breakage
1.1.2 Conveyor road:
  advanced road end on a dirtband (average thickenss 1 m). Consolidation by injection of bottom coal.
1.1.3 Top road:
  Securing of advanced longwall face end by backfilling with anhydrite.
1.2 Time
  Rock and coal consolidation was performed during the night shift
1.3. Installation
  The existing injecting pipeline installation was used in the test without alteration.
  Machinery: two components - resin pump
  Performance: 15 l/min.
  Mixing ratio: 1:1 (volumetric)
  Tube length: approx. 350 m
  Tube diameter: 13 mm, component A
  Tube diameter: 20 mm, component B
  Resin dispenser: intermediate cocks with an opening of 13 mm
  Injecting equipment: Conventional lance with bore hole packer
1.4 Performance of test
  The 171 containers available, each containing 30 l were placed into 35 bore holes:

| Number of bore holes | | | Number of containers | Average number of containers per bore hole |
| --- | --- | --- | --- | --- |
| conveyor road | longwall face | top road | | |
| 3 | 4 | — | 43 | 6 |
| 6 | 6 | — | 52 | 4.3 |
| 4 | 6 | — | 65 | 6.5 |
| — | — | 6 | 12 | 2 |
| 13 | 16 | 6 | 172 | 4.9 |

Results:

No problems arose when using the material of the invention with the installed equipment. The new material was easy to apply in view of its flow and injection properties. The reaction behaviour was adjusted to the particular application; only minor amounts of liquid material come forth from the fissures in the rock after the pump had been turned off. Depending on the jointing of the rock, the new material was found to flow long distances and to distribute itself evenly in the fissures. The adhesion of the material to the coal and rocks was rated as good.

Checks before each night shift showed that in all cases after mining the face was still standing bankright. Backbreaking was no more observed. Nor were any new breakages in the rocky top layer observed. Previous breakage zones were consolidated.

It is remarkable that consolidated rock or coal on account of the bonding properties of the new material could be processed easily with the existing pneumatic equipment. This makes work easier when breaking the coal manually, for instance in advanced longwall face ends. Moreover, the injecting equipment could be recovered each time from the borehole after injection to be used again.

Test Report 2

Consolidation of a concrete shaft lining

In a tunnelling area consisting of a vertical concrete shaft with a connecting bell-shaped lower end and located at a depth of about 780 m, there was water with a pH value of about 4 which was flowing into and from the hollow spaces behind the concrete shielding at a rate of about 20 l/min causing severe chemical damage to the concrete.

In order to seal the hollow spaces so as to protect the rock formation from the flow of water, a number of boreholes were driven into the concrete. Each of the boreholes was closed with a packer through which the material of the invention could be forced into the hollow spaces located in the vicinity of the borehole while being prevented from escaping through the borehole opening. The injection work was performed using a high pressure pumping unit which had a delivering capacity of 6-40 l/min against atmospheric pressure. The injecting machine delivered the components A and B through separate hoses to the boreholes where they were mixed using an in-line static mixer installed right in front of the packer. The components were injected at a volumetric ratio of 1:1.

Consolidation was achieved by injecting the reactive material of this invention through the packer and the in-line mixer into longitudinal fissures and hollow spaces connected with them, until either the pumping unit reached a working pressure in excess of 130 bar or the material was found to leak out from a neighboring borehole. The boreholes formed a network and were about 5 to 10 meters spaced apart.

Work was continued in a similar manner until all the hollow space behind the concrete shielding was filled with the material of the invention. Work was finished within 2 days when the flow of water stopped and the material which had gradually ceased to leak through the concrete shielding finally stopped leaking altogether.

We claim:

1. A process for consolidating and sealing coal and-/or rock, soil or brick formations in mining, tunnelling and construction by reacting polyisocyanates and aqueous alkali silicate solutions in the coal and/or rock, soil or brick formation to be consolidated, characterized in that the reaction is performed in the presence of a catalyst prompting trimerization of the polyisocyanate and in that, considering the composition and amount of the aqueous alkali silicate solution in relation to the amount of polyisocyanate, the catalyst is used in such an amount per mole of NCO groups in the reaction mixture that interwoven networks of inorganic and organic polymers are formed during the reaction 2. The process according to claim 1, characterized in that the catalyst is used in an amount of 6.0 to 14.5 mmole per mole of NCO groups.

3. The process according to claim 2, characterized in that the catalyst is used in an amount of 8.5 to 13.8, and in particular 10.2 to 13.3 mmole per mole of NCO groups.

4. The process according to claim 1, characterized in that the polyisocyanate used contains 10 to 55 weight percent of NCO groups, based on the mass of polyisocyanate.

5. The process according to claim 1, characterized in that 4,4'-diphenylmethane diisocyanate, a phosgenation product of aniline formaldehyde condensates (crude MDI) or a prepolymer thereof is used as polyisocyanate.

6. The process according to claim 5, characterized in that a reaction product of crude MDI and glycol-initiated polysiloxane having an OH number of 40 to 200 is used as prepolymer.

7. The process according to claim 1, characterized in that an aqueous alkali silicate solution with a solids content of 40 to 60 weight percent is used.

8. The process according to claim 1 or 7, characterized in that an aqueous alkali silicate solution wherein the molar ratio of $SiO_2$ to $Me_2O$ is 2.09 to 3.44, preferably 2.48 to 3.17 is used.

9. The process according to claim 1, characterized in that the polyisocyanate and the alkali silicate solution are used in a $NCO/SiO_2$ molar ratio of 0.8 to 1.4, preferably 0.85 to 1.15.

10. The process according to claim 1, characterized in that a volatile substance is used in an amount of at most 3.5 weight percent, based on the total mass of the reaction mixture.

11. The process according to claim 1, characterized in that antimony trioxide is added to the mixture containing the catalyst.

12. The process according to claim 1, characterized in that at least one cocatalyst promoting the trimerization reaction is used.

13. The process according to claim 12, characterized in that trialkyl phosphanes, alkali metal salts of carboxylic acids or transition metal compounds such as $Sb_2O_3$, $ZrOCl_2$, $SbCl_5$, $CuCl$ and $FeCl_3$ are used as cocatalyst.

14. A process for consolidating and sealing coal and-/or rock soil or brick formations in mining, tunnelling and construction by reacting polyisocyanates and aqueous alkali silicate solutions in the coal and/or rock, soil or brick formation to be consolidated, characterized in that the reaction is carried out in the presence of a catalyst prompting the trimerization of the polyisocyanate and in that (a) the catalyst is used in such an amount per mole of NCO groups in the reaction mixture and (b) considering its $SiO_2$ content, the alkali silicate solution is used in such a ratio to the NCO in the polyisocyanate that interwoven networks of inorganic and organic polymers are formed during the reaction.

* * * * *